(12) United States Patent
Kumar et al.

(10) Patent No.: US 9,275,398 B1
(45) Date of Patent: Mar. 1, 2016

(54) OBTAINING METRICS FOR CLIENT-SIDE DISPLAY OF CONTENT

(71) Applicant: A9.com, Inc., Palo Alto, CA (US)

(72) Inventors: Neil Raj Kumar, Mountain View, CA (US); Ryan McKenzie White, Mountain View, CA (US); Akshay Manoharlal Bharadia, Maharashtra (IN); Mihnea Catalin Marinescu, Fremont, CA (US)

(73) Assignee: A9.com, Inc., Palo Alto, CA (US)

( * ) Notice: Subject to any disclaimer, the term of this patent is extended or adjusted under 35 U.S.C. 154(b) by 224 days.

(21) Appl. No.: 13/709,998

(22) Filed: Dec. 10, 2012

(51) Int. Cl.
  *G07B 17/02* (2006.01)
  *G06Q 30/02* (2012.01)

(52) U.S. Cl.
  CPC .................................. *G06Q 30/0242* (2013.01)

(58) Field of Classification Search
  CPC .......... G06Q 30/0212; G06Q 30/0201; G06Q 30/02; G06Q 30/0267; G06Q 30/0242
  USPC ............................................... 705/7.29, 14.14
  See application file for complete search history.

(56) References Cited

U.S. PATENT DOCUMENTS

| | | | |
|---|---|---|---|
| 7,565,429 B1 * | 7/2009 | Fernandez | 709/224 |
| 2008/0153513 A1 * | 6/2008 | Flake et al. | 455/456.3 |
| 2009/0125343 A1 * | 5/2009 | Cradick et al. | 705/7 |
| 2009/0222554 A1 * | 9/2009 | Schneider | 709/224 |

\* cited by examiner

*Primary Examiner* — Thomas M Hammond, III
*Assistant Examiner* — Kyle Mosley

(57) ABSTRACT

Active script can be provided with content to be displayed on a computing device to determine whether advertising, intended to be displayed with the content, is actually displayed by the computing device. The script can examine various aspects of the code used to render the content, to determine whether ad-blocking software is blocking the ad or something is otherwise preventing the advertising from being displayed. Information about the visibility of the advertising can be sent to a location such as a logging service, which can store the data until such time as the data is to be retrieved and processed, such as to determine an extent to which client devices are blocking ads to be displayed with content.

25 Claims, 6 Drawing Sheets

```
<div id="advertisementDiv">
<div class="individualAdText">
<a href="http://www.jacketadvertiser.com">AWESOME NEW FLEECE JACKETS!</a>
</div>
<div class="individualAdText">
<a href="http://www.anotherjacketadvertiser.com">MORE NEW FLEECE JACKETS!</a>
</div>
</div>
```

```
#advertisementsDiv {
  padding-top: 4px;
  width: 100%;
  height: 150px;
  display: inline-block;
  visibility: visible;
  opacity: 0%;
  font-family: verdana,arial,helvetica,sans-serif;
}

.individualAdText {
  width: 100%;
  height: 25px;
  display: inherit;
  visibility: inherit;
  opacity: inherit;
  color     : #CC6600;
  text-transform : none;s
  font-size     : 98%;
  font-family: inherit;
  font-weight: bold;
  letter-spacing : normal;
}
```

```
var widgetId = advertisementDiv;
function elementHasHeightAndWidth (elem) {
var height = jQuery(elem).height();
var width = jQuery(elem).width();

return (height > 0 && width > 0);
} if ( jQuery("#"+widgetId).is(':hidden')
|| !elementHasHeightAndWidth("#"+widgetId
) ) {
pageLoadedParams["adblockOn"] = "1";
} else {
pageLoadedParams["adblockOn"] = "0";
}
```

OBTAINING METRICS FOR CLIENT-SIDE DISPLAY OF CONTENT

BACKGROUND

Users are increasingly utilizing computing devices to access various types of content. Oftentimes the content is provided at little or no cost to the user, with a provider of the content obtaining monetization through the display of one or more advertisements along with the content. As advertising can negatively impact the user experience in at least some cases, users have increasingly utilized what is commonly referred to as "ad blocking" software to minimize the presence of advertising on Web pages or other displays of content. Ad blocking software can prevent an ad from being requested or loaded, or can at least prevent the ad from being visible to the user. Such functionality can impact the ad-based revenue of the provider, and can impact the advertiser attempting to display that ad as well. Content providers, advertisers, and other such entities can benefit from obtaining information about the prevalence of ad-blocking software among users accessing the content. Conventional approaches, however, do not provide a way for such an entity to readily determine whether a client device, under the control of a remote user, is using ad-blocking software to prevent the display of advertising.

BRIEF DESCRIPTION OF THE DRAWINGS

Various embodiments in accordance with the present disclosure will be described with reference to the drawings, in which:

FIGS. 3(a), 3(b), and 3(c) illustrate example code, tags, or values that can be utilized to determine whether a client device is blocking or otherwise manipulating the display of advertising in accordance with various embodiments;

DETAILED DESCRIPTION

Systems and methods in accordance with various embodiments of the present disclosure overcome one or more of the above-referenced and other deficiencies in conventional approaches to monitoring the display of advertising and/or other content in an electronic environment. In particular, various embodiments utilize active scripting on a client device to determine whether the display of content, such as advertising, has been prevented and/or modified by software executing on the client device. In some embodiments, an active script such as JavaScript® can analyze code (e.g., HTML) for content displayed on a computing device to determine whether tags, values, or other information indicative of advertising have been removed or adjusted to prevent or minimize the display of that advertising. Other aspects of the display can be determined as well, such as which portions of the content were visible, which portions of the content the user interacted with, etc. The JavaScript can cause this information to be submitted to a logging service or other such entity which can store the information for subsequent retrieval and/or analysis. In at least some embodiments the logged information might be processed or transformed to be in a format useful for aggregating with other data of a provider or advertiser, for example, in order to allow for conventional querying, reporting, or other such tasks.

Various other functions and advantages are described and suggested below as may be provided in accordance with the various embodiments.

Figure 1A:
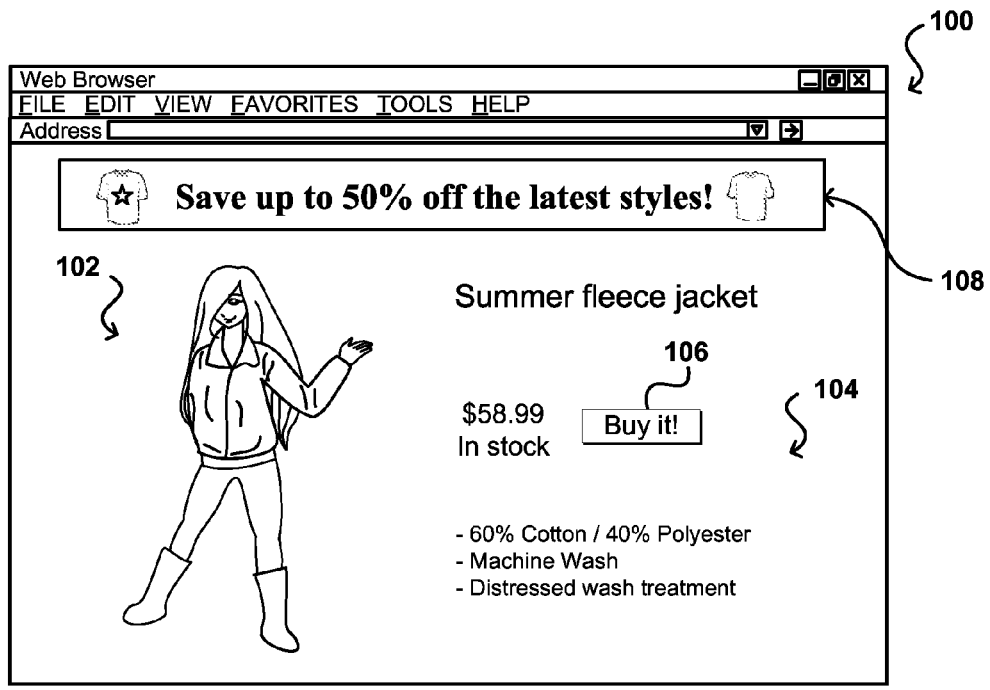
FIGS. 1(a) and 1(b) illustrate example displays of content including advertising that can be provided in accordance with various embodiments.
Figure 1B:
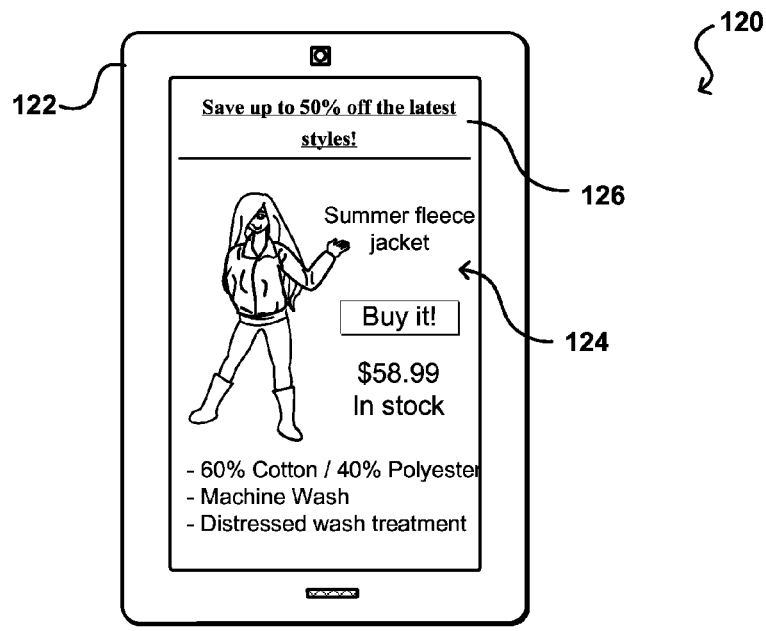

FIG. 1(a) illustrates an example of a display 100 of content that can be presented in accordance with various embodiments. In this example, a user has requested a page of content corresponding to a jacket of interest to the user. The content can include, for example, an image 102 of the jacket, a description 104 of the jacket, an option 106 to purchase the jacket, and other such information or content. While a page of content relating to an item is presented for purposes of explanation, it should be understood that other types of content, such as search results, electronic book content, multimedia content, and the like, can be presented to a user via a computing device as well within the scope of the various embodiments. As illustrated, the display 100 also includes an advertisement 108 displayed with the content. The advertisement might be provided with the content, or the code (e.g., HTML, XML, CSS, etc.) for displaying the content might include code causing one or more advertisements to be obtained from a third party and displayed with the content, according to any restrictions set by the content provider. As illustrated in the display 120 of FIG. 1(b), the code can include instructions enabling the advertisement to be selected and/or displayed differently according to a specific type of device 122 or device characteristics, display or window settings, or other such information. In FIG. 1(b) a similar advertisement 126 is displayed with content 124 for the item of interest, which might also have display settings, content, or characteristics adjusted for the type of device, screen, settings, etc. In this example, however, the advertising is primarily in the form of text and/or hyperlinks, among other such options.

Figure 2:
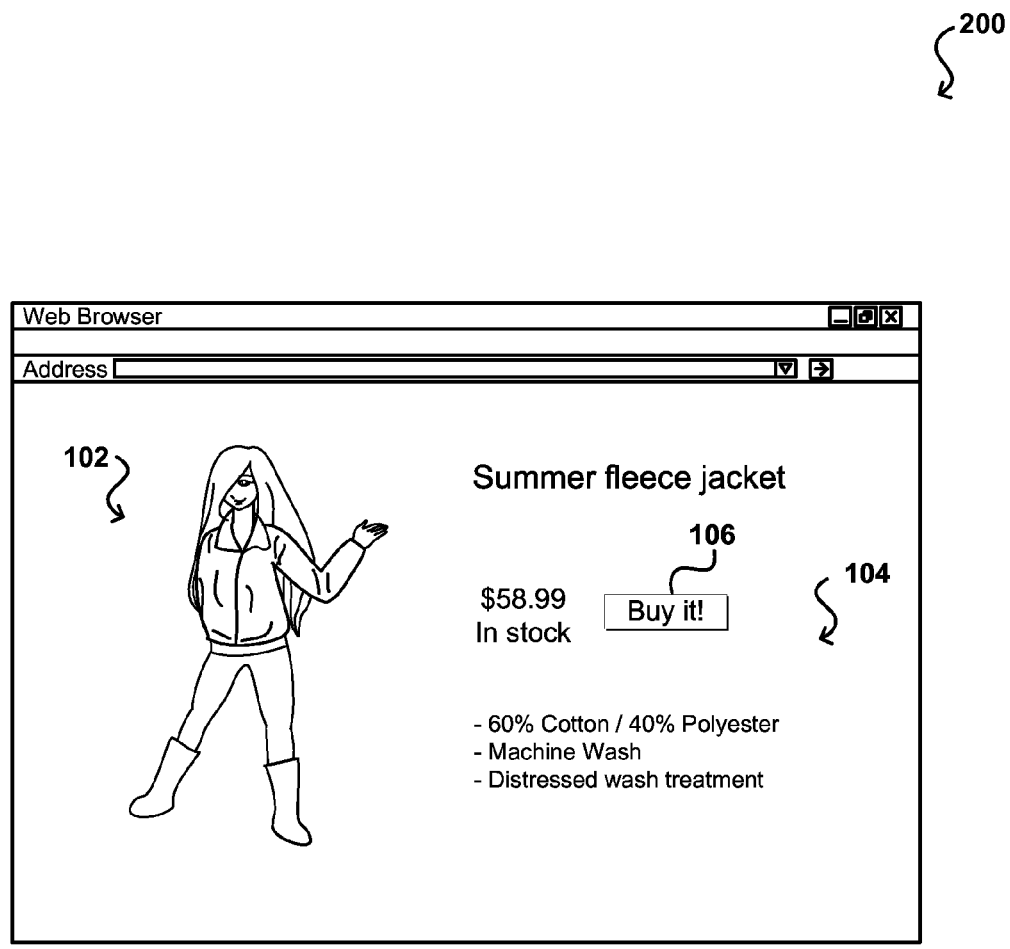
FIG. 2 illustrates an example display of content where the advertising has been hidden or otherwise blocked by software on a client device.

As mentioned, the computing device used to display the content might utilize software, such as ad-blocking software or content-control software, to prevent and/or minimize the display of advertising on the device. In some embodiments, applications such as Web browsers used to display content can include ad-blocking functionality to prevent such display. As an example, FIG. 2 illustrates a display 200 of content similar to that of FIG. 1(a), but where ad-blocking software has prevented the display of the advertisement illustrated in FIG. 1(a). While such functionality can potentially improve the user experience, the user is unable to view the ad, follow a link associated with the ad, purchase a product or service associated with the ad, or perform another such task which can result in revenue for the provider of the content. Accordingly, the user is then essentially getting the content for free, which when used by a significant number of users can potentially cause the provider to no longer be able to afford providing the content without charging users or otherwise obtaining revenue. Providers, advertisers, and other such entities would thus like to be able to determine a prevalence of such software to determine the ability to monetize the content through advertising, in order to determine whether other monetization approaches should be used, whether other advertising approaches should be taken, of for any of a number of other such purposes.

Approaches in accordance with various embodiments can take advantage of active script, such as JavaScript, executing on the client device to obtain information about the content displayed on the device and report that information to a logging service or other such entity for subsequent retrieval and/or analysis. The script can be installed on the client device, part of an application used to view the content, included with the code used to display the content, and/or contained within the content itself. Various other ways of causing the script to be executed on (or in communication with) the client device can be utilized as well within the scope of the various embodiments.

Approaches in accordance with various embodiments take advantage of the fact that conventional ad-blocking software manipulates and/or prevents the display of advertising primarily in a number of specific ways. When advertising is displayed with content on a Web page, for example, the code (e.g., HTML or CSS) for the page will typically include one or more specific entries that are associated with advertising. The ad-blocking or other software can take advantage of these entries to determine likely advertising and adjust the code to affect the display of that advertising.

For example, FIG. 3(a) illustrates a first example of a section of HTML code 300 that can be used to display content in accordance with various embodiments. In this example, the code includes a <DIV> tag that separates out the advertising from the main content, as <DIV> tags typically are used to designate logical sections of a document, page, or other piece of content. Various other such tags or indicators can be utilized as well for other protocols, technologies, etc. The code also includes a link to be used with an advertisement, where the link is associated with a known advertising entity. The code can include other objects as well, such as links to one or more images, which can include an associated hyperlink to a different domain in some embodiments. Any or all of these occurrences can be indicative of an advertisement to be displayed with the content. Similarly, FIG. 3(b) illustrates an example of CSS code 320 including <DIV> elements directed to advertising. Various other types of code for displaying an advertisement can be included as well in various other examples. Ad-blocking software can be programmed to detect any of these or other indicators of advertising and adjust the code used to display the content in order to impact the display of the advertising. As an example, FIG. 3(c) illustrates sample JavaScript code 340 for detecting ad-blocking software that can be utilized in accordance with various embodiments.

For example, ad-blocking software can determine a section corresponding to an advertisement that might be separated from the main content section using a <DIV> or similar element. The ad-blocking software might cause the entire section corresponding to the <DIV> to be deleted from the code before rendering the display of content. In some embodiments the ad-blocking software might replace the link to the advertising image with a link to a dummy image, such as a transparent image of one pixel in width and one pixel in height. Such an approach keeps the <DIV> section in the code, as the removal of these sections for some displays of content can inadvertently impact other sections of the page as well. In other embodiments the ad-blocking software could set the height and/or width of the ad space to 0 pixels, set the opacity/visibility/transparency value such that the image is not displayed and/or visible, or perform another such action. Active code on the client device then can check for the occurrence (or lack of occurrence) of such values or code, and can report the findings to a logging service or other such entity. In many cases a user will have the ability to opt-in or opt-out of such reporting or client-side metric generation, or can otherwise control the type of information that can be automatically obtained from the device.

Since the most popular ad-blocking software, which can take the form of a standalone application, plug-in, feature of a browser, etc., typically attempts to minimize impact on the delivery of non-advertising content, portions of the code are likely not deleted but instead various properties adjusted, which enables active script included with the code to be executed on the client device in many cases. In at least some embodiments, the code for a page of content can include a module, object, widget, or other code segment that includes script programmed to execute on the client device and determine whether code such as a <DIV> element associated with advertising has been rendered visible on the client device. A determination of visibility can be based on a number of different factors (e.g., CSS properties) as discussed elsewhere herein, as may include values for height, width, opacity, visibility, transparency, and the like. The script can be configured to then report or otherwise send information for the determination, along with any other identifying or collected information, to a remote location, such as a logging service, for subsequent analysis. The reporting can be done shortly after the determination is completed, the next time the device transfers information, when a determined amount of information has been gathered, at regular intervals, or at any other appropriate times. Further, the destination for the information can be associated with the provider of the content, the advertising entity, or a third party providing statistics or metrics on ad blocking, among other such options.

The active script can be included in an ad response, for example, where the script is included with code for displaying the advertisement. As known in the art, displays of content such as Web pages often include calls or requests to one or more servers or services to obtain advertising for a page, and an ad response is returned that includes the code for displaying the ad, information for the ad, any images for the ad, etc. The script can be included with each such response, or can be included in a determined fraction or percentage of the ad responses in order to obtain information for a sampling of the content displays. In other embodiments the script could be provided with the code for the main content display, installed on the client device, or otherwise provided.

Figure 4:
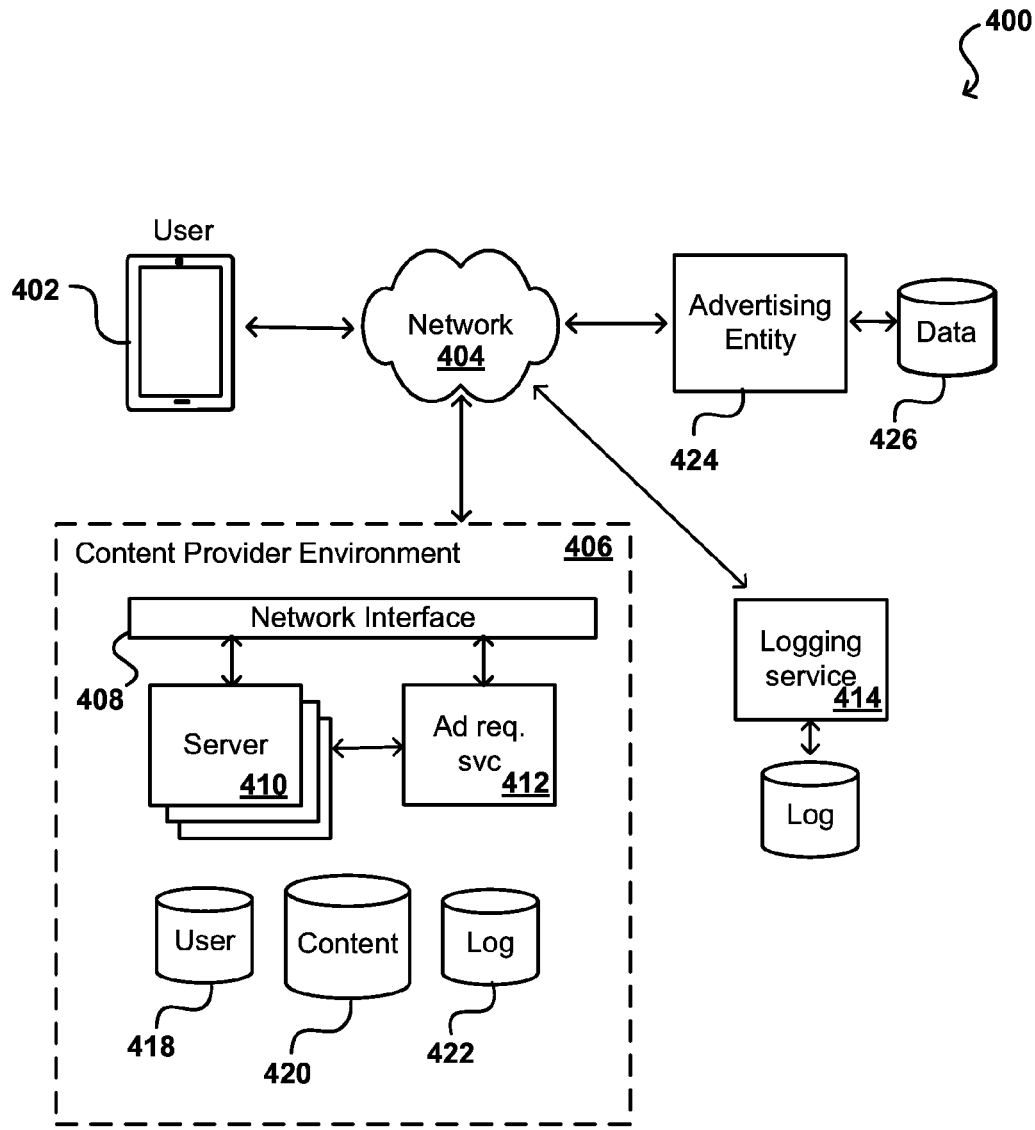
FIG. 4 illustrates an example environment in which aspects of the various embodiments can be implemented.

FIG. 4 illustrates an example environment 400 in which various embodiments can be implemented. In this example, a user is able to use a client device 402 to submit a request for content, such as a Web page or electronic book, across at least one network 404. Although a portable computing device (e.g., an electronic book reader, smart phone, or tablet computer) is shown as the client device, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, and portable media players, among others. The at least one network 404 can include any appropriate network, such as may include the Internet, an Intranet, a local area network (LAN), a cellular network, and the like. The request can be sent to an appropriate content provider environment 406, which can provide one or more services, systems, or applications for processing such requests.

In this example, the request is received to a network interface layer 408 of the content provider environment 406. The network interface layer can include any appropriate components known or used to receive requests from across a network, such as may include one or more application programming interfaces (APIs) or other such interfaces for receiving such requests. The network interface layer 408 might be owned and operated by the provider, or leveraged by the provider as part of a shared resource or "cloud" offering. The network interface layer can receive and analyze the request from the client device 402, and cause at least a portion of the information in the request to be directed to an appropriate system or service, such as a server 410 (e.g., a Web server or application server), among other such options. In the case of Web pages, for example, at least one server 410 might be used to generate code and send content for rendering the requested Web page. In cases where processing is to be performed, such as to generate search results, perform an operation on a user input, verify information for the request, etc., information might also be directed to at least other server 410 for processing. The servers or other components of the environment might access one or more data stores, such as a data store 418 that contains information about the various users, and one or more content repositories 420 storing content able to be served to those users.

Once the appropriate components of the content provider environment 406 have determined the appropriate information, a response can be returned to the client device 402 over the network. This can include any relevant content, as well as code and/or script for rendering the content. As discussed, if advertising is to be included with the display of content, the code can also include code, links, or other information for obtaining the advertising. As discussed, this can include code for controlling display properties of the ad, as well as a call to one or more advertising entities 424 to obtain information for the advertisement, as may include text and/or image information stored in at least one data store 426. Where the ad is to be provided from an advertising entity, a browser application on client device 402 in some embodiment can be caused to submit a request to the advertising entity 424 across the network, which can return a response including the image, text, or other information for the ad(s) to be displayed. The request can include any appropriate information for selecting an ad to display as known in the art for such purposes. In some embodiments, the script on the page can cause a request to be submitted to an ad request service 412, or other such component, that can communicate with the advertising entity 424 and then package the active script with the advertising content for submission to the client device 402. In other embodiments, the advertising and script will be determined by the ad request service 412 when the page is rendered, and the information will all be sent together to the client device 402. In at least some embodiments, the ad request service is configured to first determine whether the user and/or client device has opted in to, or out of, the tracking of client side metrics before including the active script with the ad response.

When the page of content and any ads are loaded, and when the active script on the page is executed, the active script executing on the client device 402 can analyze the properties of the page displayed to determine whether the ad is visible. The script can then cause at least one call or request to be submitted to a least one logging service 414, within or outside the provider environment 406, where the call or request included information about the visibility of the advertising and/or the presence of ad-blocking software, among other such options. In some embodiments the information can be a true/false value or similar indicator of whether ad blocking is active on the client. The information can then be stored to a log data base or similar location for subsequent analysis. In some cases, the information in the log data store will periodically be pulled and transformed to a format that can be stored to a table in the user data store, or other data repository or data store 422, for reporting or statistical analysis with other data, enabling various types of reporting and analysis to be performed across various types of data.

Figure 5:
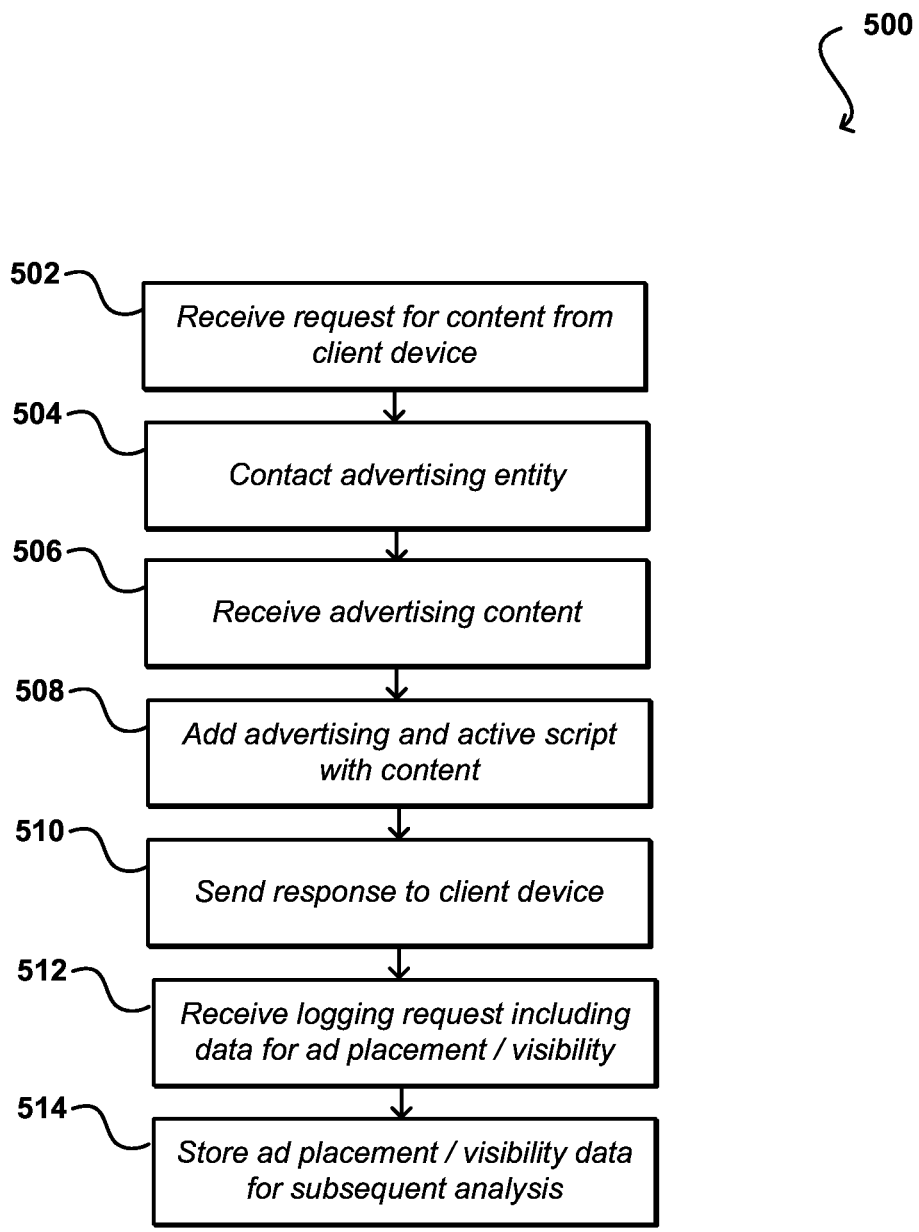
FIG. 5 illustrates an example process for determining whether a client device is preventing and/or manipulating the display of advertising that can be utilized in accordance with various embodiments.

FIG. 5 illustrates an example process 500 for obtaining client-side metrics for advertising blocking and/or display that can be utilized in accordance with various embodiments. It should be understood that there can be additional, fewer, or alternative steps performed in similar or alternative orders, or in parallel, within the scope of the various embodiments unless otherwise stated. In this example, a request for content is received 502 from a client device. Code and/or content for the request is determined for the request. An advertising entity can be contacted 504 for advertising content, where the advertising entity can be contacted by the client device, an advertising request service, or another such component as discussed herein. Once the advertising content is received 506, the advertising content and active script can be added 508 with the requested content and a response sent 510 to the client device, where that response contains the ad, the content, and the script. When the script executes on the client device, the script will determine whether ad blocking software is active on the client device based upon any of various factors as discussed herein. A logging request, such as an AJAX request, then can be received 512 where that logging request includes information about whether the ad blocking software was active and/or the advertising was visible on the client device. The visibility data for the client device then can be stored 514 or logged for subsequent analysis.

In addition to ad blocking and/or visibility, various other client side metrics can be obtained using a similar approach. Any widget, module, or other code segment transmitted to a client device can potentially include active script that, when executed, can determine one or more aspects about what was performed and/or displayed on the client device. This data can include, for example, rate of viewing, scrolling or resizing by a user, window dimensions, amount of interaction (e.g., cursor or finger hover) by one or more users, etc.

Upon obtaining client side-metrics, a provider or advertiser can monitor the effectiveness of various approaches. For example, the provider can change the way ads are displayed or the source of various ads to attempt to get around ad blocking algorithms. The provider also can whitelist various ads, which can reduce the rate of those ads being blocked. The provider also can determine, based upon the amount of revenue being generated by advertising, whether a user should be charged for access to the content and/or resources provided, as well as how much to charge.

Figure 6:
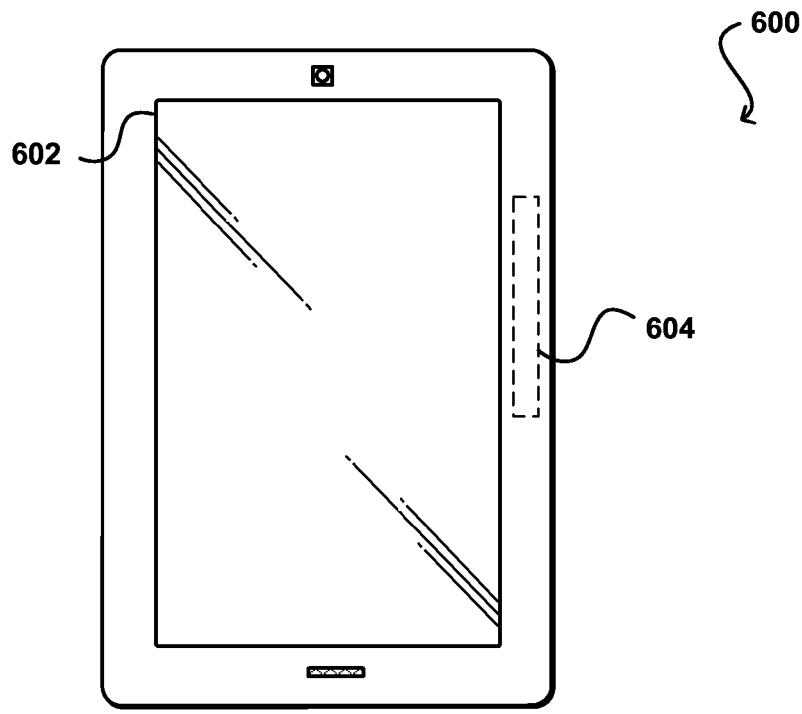
FIG. 6 illustrates an example device that can be used to implement aspects of the various embodiments.

FIG. 6 illustrates an example electronic user device 600 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 600 has a display screen 602 on the front side, which under normal operation will display information to a user facing the display screen (e.g., on the same side of the computing device as the display screen). It should be understood that computing devices such as servers, however, may not have dedicated display elements. The example computing device 600 also includes at least one networking component 604, such as a network interface card, wireless networking component, and the like, enabling the computing device to communicate information over at least one network.

Figure 7:
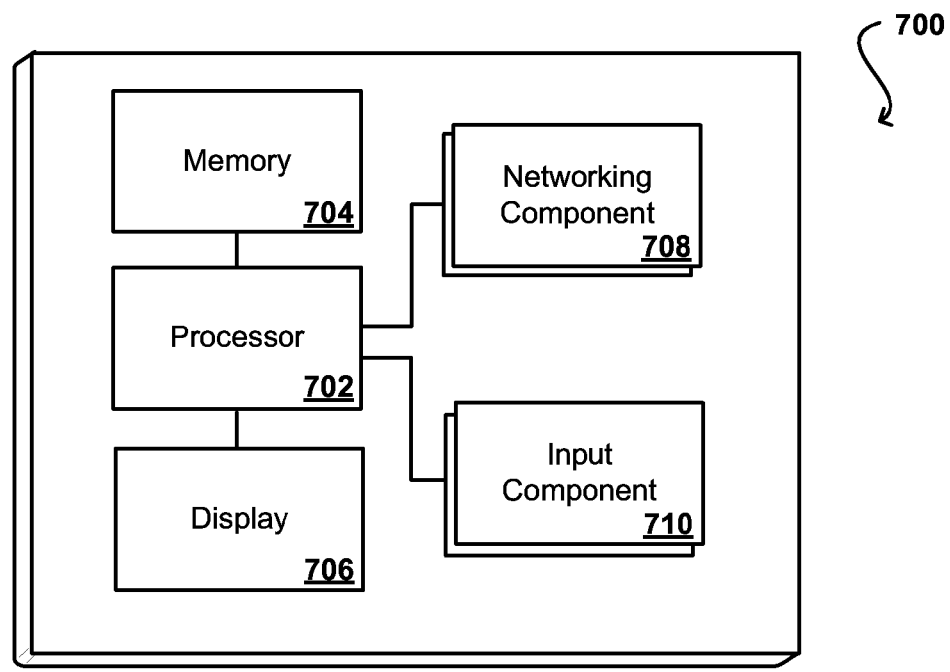
FIG. 7 illustrates example components of a client device such as that illustrated in FIG. 6.

FIG. 7 illustrates a logical arrangement of a set of general components of an example computing device 700 such as the device 600 described with respect to FIG. 6. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. In some embodiments, the computing device 700 of FIG. 7 can include one or more networking and/or communication elements 708, such as a Wi-Fi, Bluetooth, RF, wired, or wireless communication system. The device in many embodiments can communicate with a network, such as the Internet, and may be able to communicate with other such devices. In some embodiments the device can include at least one additional input component 710 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

As discussed, different approaches can be implemented in various environments in accordance with the described embodiments. As will be appreciated, although a Web-based environment may be used for many examples herein for purposes of explanation, different environments may be used, as appropriate, to implement various embodiments. Such a system can include one or more electronic client devices, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof.

An illustrative environment can include at least one application server and data store. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of any system herein should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of monitoring visibility of advertising content on a computing device, comprising:

receiving, from the computing device, a request for content, the computing device having a processor and a memory;

providing, by a content provider server, a response to the computing device, the content provider server having a server processor and a server memory, the server processor generating the response including the content corresponding to the request, advertising to be displayed with the content, a script and code for displaying the content stored in the server memory, wherein the script is executable by the processor of the computing device to analyze the code for displaying the content;

receiving, from the computing device, an indication that blocking software is executing on the computing device, the blocking software enabled to block the advertising;

determining code from the blocking software based at least in part on the indication, the blocking software capable of implementing a plurality of methods to block the advertising based at least in part on the code;

identifying a method from the plurality of methods implemented by the blocking software to block the advertising on the computing device, the identifying based at least in part on the code from the blocking software;

receiving, from the computing device, a visibility of the advertising, the visibility indicating a viewable area of the advertising;

generating information associated with the visibility of the advertising, the information including the method implemented by the blocking software and the code from the blocking software;

storing the information for subsequent analysis;

determining the advertising to be displayed with the content;

modifying the script, thereby generating a modified script to display the advertising with the content, the modified script including the information associated with the visibility of the advertising, the method implemented by the blocking software, and the code from the blocking software; and transmitting the modified script to the computing device.

2. The computer-implemented method of claim 1, further comprising:

analyzing the information to determine a prevalence of ad-blocking software by one or more users accessing the content.

3. The computer-implemented method of claim 1, further comprising:

contacting an advertising entity to obtain the advertising.

4. The computer-implemented method of claim 1, wherein the visibility received from the computing device includes information regarding at least one of a rate of viewing, a rate of interaction, an effect of the blocking software on an amount of the viewable area of the advertising, or a size of display of at least one of the content or the advertising.

5. A computer-implemented method, comprising:

receiving, from a computing device, a request for content, the computing device having a processor and a memory;

providing, by a content provider server, the content corresponding to the request to the computing device, the content provider server having a server processor and a server memory, the server processor generating advertising to be displayed with the content, code for displaying the content stored in the server memory, and a script, wherein the script is configured to be executed by the processor of the computing device to analyze the code for displaying the content;

receiving, from the computing device, a detection that blocking software is executing on the computing device, the blocking software enabled to modify a visibility of the advertising;

determining code from the blocking software based at least in part on the detection;

identifying a functionality implemented by the blocking software to modify the visibility of the advertising, the identifying based at least in part on the code from the blocking software, the visibility indicating a viewable area of the advertising;

receiving, from the computing device, an indicator of the visibility of the advertising;

generating information associated with the visibility of the advertising, the information including the functionality implemented by the blocking software, the code from the blocking software, and the indicator;

receiving, from the computing device, metrics regarding the visibility of the advertising;

modifying the script, thereby generating a modified script to increase the visibility of the advertising to be displayed with the content, the modified script to include the information associated with the visibility of the advertising, the functionality implemented by the blocking software, the code from blocking software, and the indicator; and storing the information and the metrics for subsequent analysis.

6. The computer-implemented method of claim 5, wherein the content is provided in a first response and the advertising and the script are provided in a second response, and further comprising:

receiving, from the computing device, a request for the advertising, the request being triggered by code for rendering the content, the code being included in the first response; and requesting the advertising from at least one third party advertising entity.

7. The computer-implemented method of claim 5, wherein the advertising is obtained using an ad request service configured to:

request the advertising from the at least one third party advertising entity; and format the code for displaying the content with the advertising and the script, the script configured to be executed by the processor of the computing device to modify the visibility or placement of the advertising, or an amount of the viewable area of the advertising.

8. The computer-implemented method of claim 5, further comprising:

analyzing the information to determine a prevalence of ad-blocking software by one or more users accessing the content.

9. The computer-implemented method of claim 8, further comprising:

updating a revenue forecast based at least in part upon the prevalence of the ad-blocking software.

10. The computer-implemented method of claim 8, further comprising:

optimizing a display layout for at least one of the content or the advertising based at least in part upon the prevalence of the ad-blocking software.

11. The computer-implemented method of claim 8, further comprising:

analyzing the information to determine at least one performance metric for each of a plurality of advertisements; and utilizing the at least one performance metric to select one or more advertisements to display for subsequent requests for the content.

12. The computer-implemented method of claim 5, wherein the information is stored by a logging service, and further comprising:

extracting the information from the logging service and formatting the information for insertion into a data store containing data for a provider of the content.

13. The computer-implemented method of claim 5, wherein the script comprises JavaScript configured to be executed by a browser of the computing device.

14. The computer-implemented method of claim 5, wherein the indicator of the visibility of the advertising with the content on the computing device is based at least in part upon determining at least one of: the presence of a division tag for the advertising, a class, an attribute identifier, a height for displaying the advertising, a width for displaying the advertising, an image used for the advertising, a visibility setting, a placement setting, an opacity setting, or a transparency setting for the advertising on the computing device.

15. The computer-implemented method of claim 5, wherein the metrics received from the computing device includes at least one of a rate of viewing, the visibility, a rate of interaction, at least one coordinate for the advertising, a resolution of display, a scrolling of a page, a resize of a window, a type of interaction, or a size of display of at least one of the content or the advertising.

16. A system, comprising:

at least one server processor; and server memory storing instructions that, when executed by the at least one server processor, cause the system to:

receive, from a computing device, a request for content, the computing device comprising a processor and a device memory;

provide, to the computing device, the content corresponding to the request, advertising to be displayed with the content stored in the server memory, code for displaying the content and a script, wherein the script is configured to be executed by the processor of the computing device to analyze the code for displaying the content;

receive, from the computing device, a detection that blocking software is executing on the computing device, the blocking software configured to effect a visibility of the advertising while displaying the content, the visibility indicating a viewable area of the advertising;

receive, from the computing device, a determination that the visibility of the advertising is effected, thereby reducing an amount of the viewable area of the advertising;

determine code from the blocking software based at least in part on the detection that blocking software is executing on the computing device, the determination that the visibility of the advertising is effected, and the amount of the viewable area of the advertising;

identify a method implemented by the blocking software to effect the visibility of the advertising based at least in part on the code from blocking software, the determination, and the amount of the viewable area of the advertising;

generate information associated with the visibility of the advertising, the information including the method implemented by the blocking software and the determination that the visibility of the advertising is effected;

modify the script, thereby generating a modified script to increase the amount of the viewable area of the advertising to be displayed with the content, the modified script to include the method implemented by the blocking software and the code from blocking software; and store the information for analysis.

17. The system of claim 16, wherein the content is provided in a first response and the advertising and script are provided in a second response, and wherein the instructions when executed further cause the system to:

receive, from the computing device, a request for the advertising, the request being triggered by code for rendering the content, the code being included in the first response; and request the advertising from at least one third party advertising entity.

18. The system of claim 16, wherein the advertising is obtained using an ad request service configured to:

request the advertising from the at least one third party advertising entity; and combine the code for displaying content with the advertising and the script, the script enabled to provide the determination that the visibility is effected.

19. The system of claim 16, wherein the instructions when executed further cause the system to:

analyze the information to determine a prevalence of ad-blocking software by one or more users accessing the content.

20. The system of claim 16, wherein the determination of the visibility of the advertising with the content on the computing device is based at least in part upon determining at least one of: the presence of a division tag for the advertising, a height for displaying the advertising, a width for displaying the advertising, an image used for the advertising, a visibility setting, an opacity setting, the amount of the viewable area of the advertising, or a transparency setting for the advertising on the computing device.

21. A non-transitory computer-readable storage medium including instructions that, when executed by one or more processors of a computing system, cause the computing system to:

receive, from a computing device, a request for content, the computing device comprising a processor and a memory;

provide, to the computing device, the content corresponding to the request, advertising to be displayed with the content, code for displaying the content, and a script, wherein the script is configured to be executed by processor of the computing device to analyze the code for displaying the content;

receive, from the computing device, a detection that blocking software is executing on the computing device, the blocking software configured to modify a visibility of the advertising, the visibility indicating a viewable area of the advertising;

determine code from the blocking software based at least in part on the detection that blocking software is executing on the computing device;

identify a method implemented by the blocking software to modify the visibility of the advertising based at least in part on the code from the blocking software;

receive, from the computing device, at least one metric indicating the visibility of the advertising;

generate information associated with the visibility of the advertising, the information including the method implemented to modify the visibility, the code from the blocking software, and the at least one metric;

modify the script, thereby generating a modified script to increase the viewable area of the advertising, the modified script to include the method implemented to modify the visibility and the code from the blocking software; and store the information for subsequent analysis.

22. The non-transitory computer-readable storage medium of claim 21, wherein the content is provided in a first response and the advertising and script are provided in a second response, and wherein the instructions when executed further cause the system to:

receive, from the computing device, a request for the advertising, the request being triggered by code for rendering the content, the code being included in the first response; and request the advertising from at least one third party advertising entity.

23. The non-transitory computer-readable storage medium of claim 21, wherein the advertising is obtained using an ad request service configured to:

request the advertising from the at least one third party advertising entity; and format the code for displaying content with the advertising and the script.

24. The non-transitory computer-readable storage medium of claim 21, wherein the instructions when executed further cause the computing system to:

analyze the information to determine a prevalence of ad-blocking software by one or more users accessing the content.

25. The non-transitory computer-readable storage medium of claim 21, wherein the at least one metric of the visibility of the advertising with the content on the computing device is based at least in part upon determining at least one of: the presence of a division tag for the advertising, a height for displaying the advertising, a width for displaying the advertising, an image used for the advertising, a visibility setting, an opacity setting, an amount of the viewable area of the advertising, or a transparency setting for the advertising on the computing device.

\* \* \* \* \*